UNITED STATES PATENT OFFICE 2,545,434

3-NITRO-4-AMINO-THIOPHANES

Cyril Grob, Basel, Switzerland, assignor to Haco-Gesellschaft A. G., Gumligen, near Berne, Switzerland, a Swiss company No Drawing. Application April 5, 1949, Serial No. 85,708. In Switzerland May 8, 1946

Section 1, Public Law 690, August 8, 1946
Patent expires May 8, 1966

14 Claims. (Cl. 260—329)

The present application is a continuation-in-part application of my copending application Ser. No. 761,730 filed on July 17, 1947, now abandoned.

My present invention relates to new substituted thiophanes and more particularly to 3-nitro-4-amino-thiophanes substituted in 2-position by alkyl groups which may carry further substituents.

The new substituted thiophanes of my present invention can be represented by the following general formula

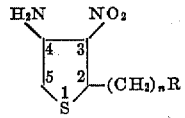

wherein $n$ means an integer from 1 to 7 inclusive and R means hydrogen, a hydroxyl, alkoxyl, halogen, formyl, carboxyl, carbalkoxy, carbamido or cyano radical.

A further object of my present invention is to provide a new method for the production of 3-nitro-4-amino-thiophanes of the above given general formula.

According to the present invention the said new and useful compounds are obtained by causing 2-nitro-2'-oxodiethylsulfides of the following general formula:

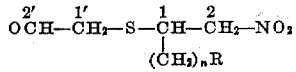

wherein $n$ and R have the above meanings, to undergo ring-closure in the presence of ammonia, which will preferably be used in a concentrated condition.

According to a modification of this invention it is also possible to use as starting materials compounds which are capable of yielding in situ the 2-nitro-2'-oxo-diethylsulfides of the above general formula. In this case compounds are used in which the aldehyde group is present in a "masked" form. For this purpose bisulfite addition compounds or acetals of the said aldehyde may be used, which aldehyde may be formed in situ, so that there is no need to isolate the said aldehyde before causing ring-closure to a thiophane derivative. In this way it is possible to carry out the reaction in the same reaction vessel.

A still further method for the production of the said new thiophane derivatives consists in that 2-substituted 3-nitro-4-hydroxy-thiophanes are converted into the corresponding 4-amino compounds. This can be effected directly by interaction with concentrated ammonia. Another way consists in esterifying the hydroxy group and subsequently causing an amino group to enter in the 4-position.

2-substituted 3-nitro-4-amino-thiophanes are easily available by these novel processes and are useful intermediates for the preparation of valuable compounds. For instance biotin, a vitamin of great importance can be prepared from 2-(4'-carboxy-butyl)-3-nitro-4-amino-thiophane. It is evident for anybody skilled in the art that by selection of suitable substituents, it is possible to also produce compounds of anti-vitamin character.

The isomeric mixture of 3-nitro-4-amino-thiophanes are suitable compounds, but can readily be converted for instance into stable 4-acetyl-amino derivatives by means of acetic anhydride.

The following examples of some preferred embodiments of the present invention are described in more detail. The invention should, of course, not be limited to these examples.

Example 1

3 parts by weight of 1-(4'-carbethoxybutyl)-2-nitro-2'-oxo-diethylsulfide are dissolved in 30 parts by volume of methanol and converted at 0° C., by the introduction of dry $NH_3$ gas, into 2-(4'-carbethoxybutyl) - 3 - nitro - 4 - amino - thiophane. The methanol solution is freed of the excess of dissolved $NH_3$ gas in vacuo, and the reaction mixture is permitted to stand at room temperature for 24 hours. After evaporation of the methanol, the residue is dissolved in ether. The nitro-amine is removed by shaking with an ice-cold, diluted hydrochloric acid solution, neutralized with a cold concentrated solution of $KHCO_3$, extracted with ether, and the ethereal solution is dried and evaporated. The hydrochloride of the nitro-amine is purified by recrystallization from ether.

The starting material used for the above condensation can be prepared as follows: 5-carbethoxy-pentanal and nitromethane are condensed in ethanol solution in the presence of a base to 1-nitro-2-hydroxy-ω-carbethoxy-hexane, B. P. $_{0.05\ mm.}$ 130° C., $n_D^{19}$=1.4595. The latter is converted into 1-nitro-2-chloro-ω-carbethoxy-hexane by means of phosphrous pentachloride in chloroform and reacted, without further purification, with the sodium salt of mercaptoacetaldehyde-diethyl-acetal of the formula

in ethanol. The diethyl-acetal of 1-(4'-carbethoxybutyl)-2-nitro-2'-oxo-diethylsulfide is thus obtained as a yellowish oil, which is sufficiently pure to be used for further reactions, but can be purified, if desired, by distillation at 130° C. in a suitable high-vacuum still: $n_D^{18}=1.4738$. Acid hydrolysis of the acetal in a dioxane-water mixture yields 1-(4'-carbethoxybutyl)-2-nitro-2'-oxo-diethyl-sulfide in form of a yellowish oil, the semicarbazone of which melts at 90–91° C. after recrystallization from an ethanol-ether mixture.

*Example 2*

3 parts by weight of 2-methyl-3-nitro-4-acetoxy-thiophane are added drop by drop at 0° C. with vigorous stirring to 20 parts by volume of a saturated solution of ammonia in methanol and the reaction mixture is allowed to stand at 0° C. for three additional hours. The liquid is evaporated at a temperature below 40° C. to dryness in vacuo, and the residue treated with ether and water. The ethereal layer is washed with a further quantity of water to remove ammonium acetate. By drying and evaporating the ethereal solution, there are obtained 3 parts by weight of stereoisomers of 2-methyl-3-nitro-4-amino-thiophane as a viscous orange oil.

The unstable isomeric mixture of the nitro-amino compound thus produced can be converted into the stable 4-acetyl amino derivatives by a treatment with acetic anhydride, a mixture of stereoisomeric 2-methyl-3-nitro-4-acetylamino-thiophanes being thus obtained, from which a stereoisomer of M. P. 180.5–181.5° C. can be separated by recrystallisation from ethanol. From the mother liquor another stereoisomer of M. P. 162–165° C. and still a further stereoisomer of M. P. 140° C. can be isolated.

Conversion of 2-methyl-3-nitro-4-acetoxy-thiophane to the 2-methyl-3-nitro-4-amino-thiophane can also be carried out by a treatment with ammonia in dioxane. The insoluble ammonium acetate formed in this way can be removed directly by filtration.

2-methyl-3-nitro-4-amino-thiophane can also be obtained by causing 2-methyl-3-nitro-4-chloro-thiophane to react with ammonia.

By reduction of the 2-methyl-3-nitro-4-amino-thiophane with iron and aqueous acetic acid a mixture of stereoisomeric 2-methyl-3,4-diamino-thiophanes, B. P. $_{0.01\ mm}$ 62–63° C. will be obtained. It is possible to produce a mixture of hydrochlorides of the latter compound melting at about 270° C. (unsharply).

The starting material used in this example, i. e. 2-methyl-3-nitro-4-acetoxy-thiophane can be prepared in the following manner: 2-methyl-3-nitro-4-hydroxy-thiophane, which may be prepared in the manner described in my co-pending application Ser. No. 85,707, filed simultaneously with the present application, is esterified by means of acetic anhydride or acetyl chloride, and the excess of the esterifying agent removed in vacuo. The nitro-ester thus produced is distilled in vacuo, B. P. $_{0.01\ mm}$ 82° C.

*Example 3*

6 parts by weight of 2-methyl-3-nitro-4-hydroxy-thiophane are mixed with 25 parts by volume of concentrated liquid ammonia and kept in a pressure vessel at 30–33° C. for 20 hours. The ammonia is then left to evaporate, the pressure vessel being evacuated at the end of the reaction. The residue is taken up in 10 parts by volume of methanol and the solution evaporated to dryness in a vacuo at 30° C. The residue is then dissolved in 50 parts by volume of ether and the ethereal solution extracted with 50 parts by volume of a 10% aqueous solution of acetic acid. The acid extract is evaporated to dryness in a vacuo. The residue consists of 5 parts by weight of stereoisomeric acetates of 2-methyl-3-nitro-4-amino-thiophanes, which constitutes a brown viscous oil.

The unstable 2-methyl-3-nitro-4-amino-thiophanes can be converted into the corresponding stable 4-acetylamino-3-nitro derivatives by means of 20 parts by volume of acetic anhydride at 70–80° C. After removing the excess of acetic anhydride by distillation in a vacuo, the residue is treated with a mixture of methanol and ether, when 4.2 parts by weight of 2-methyl-3-nitro-4-acetamido-thiophane crystallise out. By further recrystallisation from ethanol and ethanol-ether mixture a stereoisomer of M. P. 180.5–181.5° C. is first obtained. From the mother liquor further stereoisomers of M. P. 162–165° C. and 140° C. can be isolated.

*Example 4*

7.5 parts by weight of 1-(4'-carboxybutyl)-2-nitro-2'-oxo-diethylsulfide are reacted with 30 parts by volume of liquid ammonia in a pressure vessel at 30° C. for 20 hours. After evaporation of the ammonia, the contents of the vessel are dissolved in 20 parts by volume of methanol, and 7 parts by volume of acetic acid are added with cooling. The mixture is evaporated to dryness in a vacuo at 30–40° C., when a mixture of stereoisomeric 2-(4'-carboxybutyl)-3-nitro-4-amino-thiophane acetates are obtained as a viscous brown oil.

The crude product can be acetylated with acetic anhydride at temperature of 80° C. After removal of the excess of anhydride in a vacuo the residue is digested with water. The insoluble oil solidifies on standing for some time at 0° C. Thus 3.5 parts by weight of 2-(4'-carboxybutyl)-3-nitro-4-acetamino-thiophane will be obtained which can be further purified by recrystallisation from dioxane; M. P. 175–177° C. with decomposition.

The starting material for the condensation described in this example can be obtained from 1-(4'-carbomethoxybutyl)-2-nitro-2'-oxo-diethylsulfide by an alkaline and a subsequent acid hydrolysis. 1-(4'-carboxybutyl)-2-nitro-2'-oxo-diethylsulfide is thus obtained as an orange oil, which is pure enough for further use and from which a semicarbazone can be obtained melting, after recrystallisation from a methanol-water mixture, at 131–132° C. with decomposition.

*Example 5*

7.5 parts by weight of 1-(4'-carbomethoxybutyl)-2-nitro-2'-oxo-diethylsulfide are heated to 30° C. for 20 hours with 30 parts by volume of concentrated liquid ammonia in a pressure vessel. After evaporation of the ammonia the contents of the pressure vessel are dissolved in methanol and 7 parts by volume of acetic acid added, while cooling. A mixture of acetates of the 2-(4'-carbomethoxybutyl)-3-nitro-4-amino-thiophane is obtained by evaporation of the solution to dryness in a vacuo.

By acetylation of this mixture with 20 parts by volume of acetic anhydride at 80° C. for 15 minutes the corresponding acetyl derivatives will be obtained. After removal of the excess of acetic anhydride in vacuo the residue can be taken up in 100 parts by volume of water and the insoluble material extracted with ether. After standing for some time at 0° C. 2.6 parts by weight of a crystalline material is deposited from the aqueous solution. From the ethereal extract further 0.6 part by weight of crystals can be obtained. The combined crystalline material can be recrystallized from ethanol whereby a less soluble stereoisomer of d,l,2-(4'-carbamidobutyl)-3-nitro-4-acetamidothiophane, M. P. 187° C. is separated. From the mother-liquid a second benzene-insoluble stereoisomer of d,l,2-(4'-carbamidobutyl) - 3 - nitro - 4 - acetamido - thiophane, M. P. 178° C., can be isolated as well as a benzene-soluble stereoiscmer of d,l,2-(4'-carbomethoxybutyl)-3-nitro-4 - acetamido - thiophane melting at 113.5° C.

The 1-(4'-carbomethoxybutyl)-2-nitro-2'-oxo-diethylsulfide used as starting material in the above example can be obtained as follows: 5-carbomethoxy-pentanal (B. P. 13 mm. 103° C. and $n_D^{21}=1.4296$) is condensed with nitromethane in methanol in the presence of a base to give 1-nitro-2-hydroxy-ω-carbomethoxy-hexane (B. P. 0.01 mm. 115°, $n_D^{24}=1.4611$, M. P. 36°). By reaction with acetyl chloride 1-nitro-2-acetoxy-ω-carbomethoxy-hexane (B. P. 0.01 mm. 115°, $n_D^{22.5}$ 1.4503) will be obtained. This compound can be interacted with the sodium salt of mercaptoacetaldehyde-dimethyl-acetal of the formula [CH2SH.CH(OCH3)2, prepared from bromo-dimethyl-acetal and potassium-hydro-sulfide] in methanol, when the dimethylacetal of 1-(4'-carbomethoxybutyl)-2-nitro-2' - oxo-diethyl-sulfide will result as an almost colourless oil of $n_D{}^{20}=1.4802$. Acid hydrolysis of this compound in a dioxane-water mixture yields 1-(4'-carbomethoxy-butyl) - 2-nitro-2'- oxo-diethylsulfide, a yellowish oil, the semicarbazone of which melts at 109.5° C.

*Example 6*

16.3 parts by weight of 2-(4'-carbomethoxybutyl)-3-nitro-4-acetoxy-thiophane are dissolved in 150 parts by volume of dioxane and added dropwise, while vigorously stirring, to 150 parts by volume of dioxane constantly saturated by means of a dry current of ammonia passing therethrough. The addition requires 2.5 hours, during which time the temperature is not allowed to rise above 10° C. After addition is complete, stirring and introduction of ammonia gas are continued for another 3.5 hours at 10–15° C. The reaction mixture is separated from the precipitated ammonium acetate by filtration and traces of dissolved ammonia removed from the filtrate by applying a slight vacuum. The mixture of stereoisomeric 2-(4'-carbomethoxybutyl-3-nitro-4-amino-thiophanes are acetylated by addition of an excess of acetic anhydride under cooling. The reaction mixture is then kept at about 20° C. for 15 hours and evaporated to dryness under a reduced pressure. The residue is dried in vacuo and consists of 17.5 parts by weight of isomeric 2-(4'-carbomethoxybutyl)-3-nitro-4-acetylamino-thiophanes. The mixture is separated by recrystallization from benzene, from which the less soluble stereoisomer of 2-(4'-carbomethoxybutyl)-3-nitro-4-acetamino - thiophane (M. P. 112.5–113.5° C.) which yields an acid of M. P. 182° C. upon saponification, separates first. Further crystallization from benzene after the addition of ether yields a second stereoisomer of M. P. 82° C., which upon saponification yields an acid of M. P. 115° C.

The starting material used in this example, namely 2-(4'-carbomethoxybutyl) - 3 - nitro - 4-acetoxy-thiophanes can be prepared as follows: 14.7 parts by weight of 2-(4'-carbomethoxybutyl)-3-nitro-4-hydroxy-thiophane, which is obtainable in the manner described in my co-pending application Ser. No. 85,707, filed simultaneously with the present application, is esterified by treatment with 6 parts by volume of acetyl chloride. After the initial reaction has subsided, the mixture is heated to about 40° C. for one hour. The excess of acetyl chloride is removed in vacuo and the residue dissolved in ether. The latter solution is treated with 4 parts by weight of activated charcoal, filtered and evaporated to dryness. 16.3 parts by weight of the 4-acetoxy-compound are obtained in this manner.

What I claim is:

1. As new compounds, 3-nitro-4-amino-thiophanes and their stereoisomers substituted in the 2-position and corresponding to the following general formula:

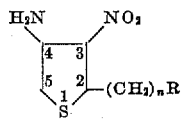

wherein $n$ means an integer from 1 to 7 inclusive and R means a member selected from the group consisting of hydrogen and carboxyl, carbalkoxy and carbamido radicals.

2. As new compounds, 2-(4'-carbalkoxybutyl) - 3-nitro-4-amino-thiophanes and their stereoisomers.

3. As new compounds, 2-(4'-carbomethoxybutyl) -3-nitro-4-amino-thiophane and its stereoisomers.

4. As new compounds, 2-(4'-carboethoxybutyl) - 3-nitro-4-amino-thiophane and its stereoisomers.

5. As new compounds, 2-(4'-carboxybutyl)-3-nitro-4-amino-thiophane and its stereoisomers.

6. As new compounds, 2-(4'-carbamidobutyl)-3-nitro-4-amino-thiophane and its stereoisomers.

7. As new compounds, 2-methyl-3-nitro-4-amino-thiophane and its stereoisomers.

8. A process for the preparation of 3-nitro-4-amino-thiophanes and their stereoisomers, substituted in the 2-position and corresponding to the following general formula:

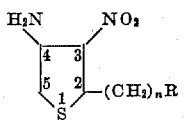

wherein $n$ means an integer from 1 to 7 inclusive and R means a member selected from the group consisting of hydrogen and carboxyl, carbalkoxy and carbamido radicals, said process comprising causing ring-closure of a 2-nitro-2'-oxo-diethyl-sulfide of the general formula:

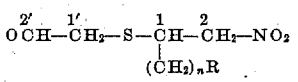

wherein $n$ and R have the same meanings as above, in the presence of ammonia.

9. A process for the preparation of 2-(4'-carbalkoxybutyl)-3-nitro-4-amino-thiophanes and their stereoisomers, comprising condensing a 1-(4'-carbalkoxybutyl) - 2 - nitro - 2' - oxo - diethyl-sulfide by ring-formation in the presence of ammonia.

10. A process for the preparation of 2-(4'-carbomethoxybutyl) - 3 - nitro - 4 - amino - thiophane and its stereoisomers, said process comprising condensing 1-(4'-carbomethoxybutyl)-2-nitro-2'-oxo-diethylsulfide by ring-formation in the presence of ammonia.

11. A process for the preparation of 2-(4'-carbethoxybutyl) - 3 - nitro - 4 - amino - thiophane and its stereoisomers, said process comprising condensing 1-(4'-carbethoxybutyl)-2-nitro-2'-oxo-diethylsulfide by ring-formation in the presence of ammonia.

12. A process for the preparation of 2-(4'-carboxybutyl)-3-nitro-4-amino-thiophane and its stereoisomers, said process comprising condensing 1-(4'-carboxybutyl)-2-nitro-2'-oxo-diethylsulfide by ring-formation in the presence of ammonia.

13. A process for the preparation of 2-(4'-carbamidobutyl)-3-nitro-4-amino-thiophane and its stereoisomers, said process comprising condensing a 1-(4'-carbamidobutyl)-2-nitro-2'-oxo-diethylsulfide by ring-formation in the presence of ammonia.

14. A process for the preparation of 2-methyl-3-nitro-4-amino-thiophane and its stereoisomers, said process comprising condensing 1-methyl-2-nitro-2'-oxo-diethylsulfide by ring-formation in the presence of ammonia.

CYRIL GROB.

REFERENCES CITED

The following references are of record in the file of this patent:

UNITED STATES PATENTS

| Number | Name | Date |
|---|---|---|
| 2,437,719 | Wolf | Mar. 16, 1948 |
| 2,440,659 | Baker | Apr. 27, 1948 |
| 2,443,598 | Cheney | June 22, 1948 |